G. W. MANSON.

Improvement in Motors for Sewing-Machines.

No. 5,039. Reissued Aug. 20, 1872.

Witnesses:

Augustus H. Sirard

J. Mott Wagner

Inventor:

George W. Manson

By Johnson, Klaucke & Co.

his Attorneys.

AM. PHOTO-LITHOGRAPHIC CO. N.Y. (OSBORNE'S PROCESS.)

UNITED STATES PATENT OFFICE.

GEORGE W. MANSON, OF NEW YORK, N. Y., ASSIGNOR, BY MESNE ASSIGNMENTS, OF THREE-FOURTHS OF HIS RIGHT TO THOMAS D. HARRISON.

IMPROVEMENT IN MOTORS FOR SEWING-MACHINES.

Specification forming part of Letters Patent No. 121,638, dated December 5, 1871; reissue No. 5,039, dated August 20, 1872.

CASE B.

*To all whom it may concern:*

Be it known that I, GEORGE W. MANSON, of the city, county, and State of New York, have invented a new and useful Motor for Transmitting Power, of which the following is a specification:

The object of my invention under this patent is to obtain a spring-power which shall be effective, durable, and compact; and my said invention consists in combining with a train of gearing and a coiled-spring case certain novel devices for winding up the spring and for putting on and stopping the power transmitted therefrom, at pleasure, thereby producing a cheap motor, applicable for such things as can be driven by manual power, and which may be easily regulated and controlled by the attendant.

Figure 1:
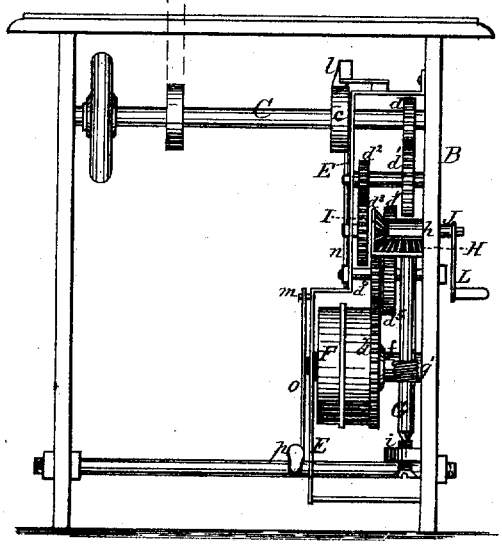
Figure 2:
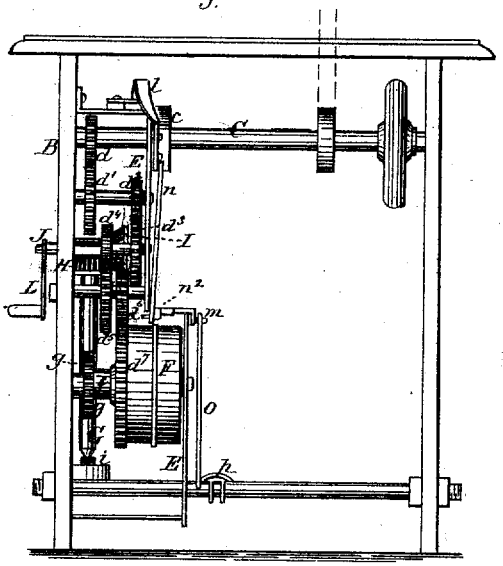
Figure 3:
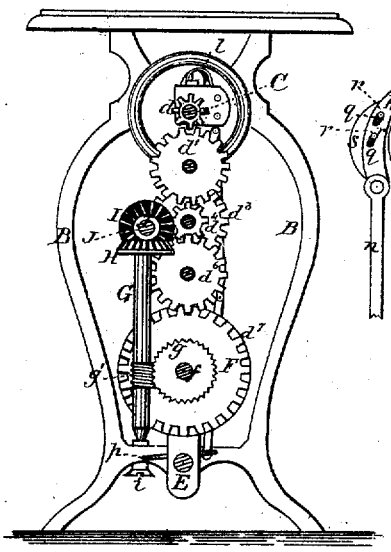
Figure 5:
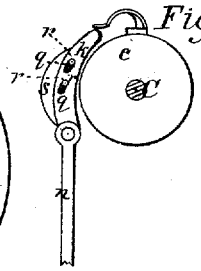
Figure 4:
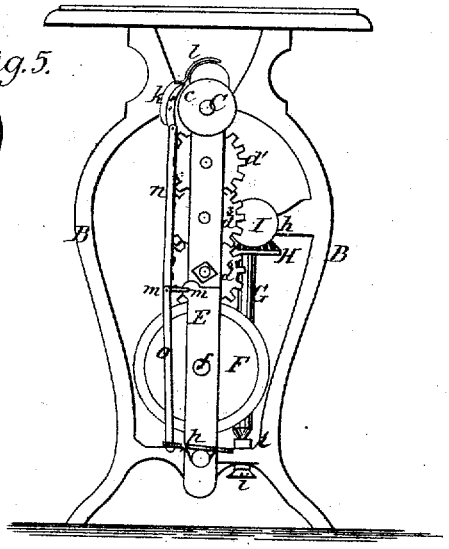

In the accompanying drawing, Figure 1 represents a side elevation of my improved motor arranged within a supporting-frame. Fig. 2 represents a view of the opposite side of the same. Fig. 3 represents an end elevation of the same, one end of the supporting-frame being removed. Fig. 4 represents a similar view looking from the opposite end of the frame; and Fig. 5 a detached enlarged view of the brake.

The mechanism of the motor may be supported by and secured within a suitable compact frame, adapted to receive the journal-bearings for the train of gear. The spring-case F is mounted in the lower portion of the frame, and the transmitting-shaft C in the upper portion thereof, and the standard E is bent toward the end B, above the spring-case, to lessen the length of the gear-wheel shafts, which match with and receive motion from the gear-wheel of the spring-case. The train consists of a pinion, $d$, on the transmitting-shaft C, and a cog-wheel, $d^7$, on the spring-case F, and intermediate pinions $d^1$, $d^2$, $d^3$, $d^4$, $d^5$, and $d^6$, through which motion is imparted to the transmitting-shaft C through the cog-wheel $d^7$ of the spring-case. This train is arranged in a very compact manner, and occupies a comparatively small space above the spring-case. The spring or springs are secured by one end to the case, and by the other to the shaft $f$, on which the case revolves freely. A worm-gear wheel, $g$, is secured on the shaft $f$, outside of the case, and gears with a worm, $g'$, on a vertical shaft, G, which is stepped in bearings $h$ $i$ on the standard B. The step $i$ of this shaft is made to screw up or down to adjust the shaft G or allow of its removal, when desired. The shaft G at its upper end carries a beveled cog-wheel, H, gearing with a beveled cog-wheel, I, on a horizontal shaft, J, supported in suitable bearings, and provided with a crank-handle, L, outside of the frame B. The journals of the several gear-wheels have their bearings in the frame, and are arranged at proper distances apart to allow of the free working of the gear.

Now, it will be seen that the worm-gear $g$ and $g'$ allow the spring to be readily wound up within its case by means of the bevel-gear H and I; but as the spring cannot turn the worm-gear backward, it cannot, therefore, unwind through said worm-gear, but must remain in a locked position with the shaft $f$ at whatever point of force the spring may be wound. This is highly important, as it dispenses with the necessity of a ratchet-wheel and spring-pawls on the winding-shaft for that purpose. The winding device by this means becomes also the locking device for the spring.

By this arrangement the spring-case must be held fast during the operation of winding the spring upon its shaft $f$, and for this purpose I have arranged in connection therewith a brake device for holding the spring-case through the train of wheels. This brake $k$ in its normal condition is held against a brake-wheel, $c$, on the driving-shaft C, by means of a spring, $l$, secured to the frame for that purpose; and as the spring-case is locked through the entire train of gear it does not require much pressure of the brake $k$ to hold the upper pinion $d$ fast while winding up the spring. In the example shown the brake $k$ is pivoted to a rod, $n$, the lower end of which is connected to a crank of a double crank-arm, $m$, secured to the standard E, and to the other crank of said arm $m$ the upper end of a rod, $e$, is connected, the lower end of which is attached to a treadle, $p$, or other suitable operating device. The brake $k$ is provided with one or two inclined slots, $q$, through which pins $r$ pass from an arm, *s*, of the frames. As the brake is moved up and down these pins *r* press it against or move it from the brake-wheel *c*, and the slot or slots are so arranged in relation to the face of the brake and the periphery of the brake-wheel that the elevation of the brake does not suddenly but only gradually relieve the friction of the brake on the wheel. The tilting of the treadle *p*, so as to raise the brake against its spring and away from the brake-wheel, renders the power free to drive the transmitting-shaft C, and the brake will be put on and the said shaft stopped whenever the treadle is released.

By this means it will be seen that the motor can be controlled at pleasure, and the speed of the transmitting-shaft restrained gradually or at once, as may be desired.

The treadle *p* can be made auxiliary to the brake-spring *l*, so that the action of the brake can be rendered positive to stop the transmitting-shaft C at any moment.

The transmitting-shaft C may be connected in any suitable manner with the thing to be driven.

What I claim under this patent is—

The spring-motor, constructed and operating to transmit power, substantially as herein described.

In testimony whereof I have hereunto set my hand in the presence of two witnesses.

GEORGE W. MANSON.

Witnesses:

CHAS. M. MARSH,

J. W. VANDEWATER.